Patented Nov. 24, 1936

2,061,779

UNITED STATES PATENT OFFICE 2,061,779

METHOD FOR PREPARING ANTIOXIDANTS

Waldo L. Semon, Silver Lake Village, Ohio, assignor to The B. F. Goodrich Company, New York, N. Y., a corporation of New York No Drawing. Application June 10, 1932, Serial No. 616,495

17 Claims. (Cl. 260—36)

This invention relates to the art of organic chemistry, and particularly to the preparation of certain aromatic amino compounds which are excellent anti-oxidants.

This invention, in brief, consists in reacting a dihydroxy diaryl alkane, and particularly a dihydroxy diphenyl dialkyl methane, with a primary or secondary aromatic amine to produce a product or series of products which are excellent anti-oxidants for rubber and other organic substances. The invention will be specifically described with reference to certain specific embodiments, but it will be understood that it is by no means limited to those embodiments.

For example, in one embodiment of the invention 169 parts by weight of diphenylamine are added to 228 parts of dihydroxy diphenyl dimethyl methane (also known as diphenylol propane) and believed to have the structural formula

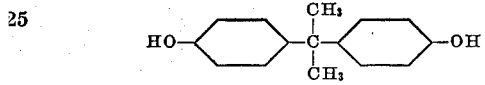

and 18 parts of concentrated hydrochloric acid in a glass lined autoclave. The mixture is heated under pressure at about 300 lbs. per square inch for about 5 hours at a temperature of approximately 250° C. and after cooling enough to reduce the pressure it is removed to a still and neutralized with a strong solution of sodium carbonate. The crude mixture is then distilled carefully, whereupon a quantity of phenol corresponding to about 90% of the dihydroxy diphenyl dimethyl methane, and about one-half of the diphenylamine is recovered. The liquid residue in the still is drained off of the sodium chloride crystals formed in the neutralization of the original mixture, and may be employed without further purification. Alternatively it may be subjected to a further distillation, about three-fourths of the product being distilled. The distillate upon cooling separates into an oily liquid and a solid crystalline substance which may be separated from the liquid. The solid crystalline distillate is apparently meso dimethyl acridane and when pure melts at 127° C. The liquid distillate is apparently a mixture of alkyl substituted diphenylamines being largely phenyl p-cumyl amine (M. P. 72° C.). The constitution of the tarry residue is not known. Each of the three fractions is an excellent anti-oxidant.

In a modification of the process just described 290 parts by weight of acetone, 940 parts of phenol, and 150 parts of concentrated hydrochloric acid are mixed and allowed to stand. At the expiration of 48 hours the mixture will have set to a mass of crystals of dihydroxy diphenyl dimethyl methane formed by the following reaction:

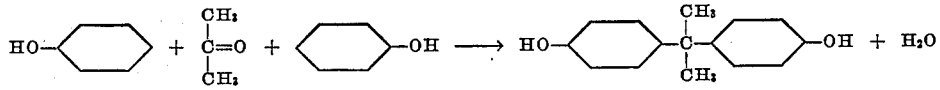

The hydrochloric acid, diluted by the water of condensation formed in the reaction separates as a lower layer and may be drained off and added to 6000 parts by weight of aniline in a glass lined autoclave. The acid combines with the aniline to form the hydrochloride, and as the liquid is heated the water boils off. The heating is continued for 24 hours at a temperature of about 300° C., the pressure in the autoclave being maintained at about 100 pounds per square inch by bleeding off the vapors either continuously or intermittently, through a pressure-release valve or the like. The vapors consist largely of ammonia, which may be recovered by absorption in water, or compression to the liquid state, but also contain considerable proportions of aniline, which may be condensed and returned to the next batch. The unreacted aniline is finally distilled off, leaving about 1700 parts of reaction mixture containing the hydrochloric acid combined in the form of diphenylamine hydrochloride. The dihydroxy diphenyl dimethyl methane previously prepared is then added and the mixture is heated in the closed autoclave as described in the preceding example. The diphenylamine and the phenol recovered from the product are employed in the preparation of the next batch, the quantity of fresh material being correspondingly reduced.

In another embodiment of the invention the dihydroxy diphenyl dimethyl methane is added directly to aniline containing aniline hydrochloride, the mixture being strongly heated either at atmospheric pressure or at a higher pressure. In this modification, as in the others already described, the product, after the removal of the unreacted portion of the raw materials, may be employed either as such or after a separation into its constituents.

The process of this invention is a general one, and may be applied to the preparation of antioxidants from any dihydroxy diaryl dialkyl methane, such as may be prepared from a phenol and an aliphatic ketone, reacted with any mono or diarylamine. The dihydroxy diaryl dialkyl methane may be prepared from any phenol such as ordinary phenol, cresol, catechol, xylenol, guaiacol, thymol, naphthol, etc. and an aliphatic ketone such as dimethyl ketone (acetone), methyl ethyl ketone, methyl propyl ketone, methyl butyl ketone, diethyl ketone, dipropyl ketone, mesityl oxide, diacetone alcohol, phorone, etc. Since the major part of the phenol is recovered unchanged it is preferred to employ the simplest compound, ordinary phenol, which most readily forms the dihydroxy diaryl alkane compounds.

The dihydroxy diaryl dialkyl methanes first formed by the condensation of ketones with phenols undergo a condensation when heated, with the elimination of half of the phenol. For example, when two mols. of the dihydroxy diphenyl dimethyl methane derived from acetone and ordinary phenol at low temperatures are heated in the presence of acid, they condense with the elimination of two mols. of phenol and the formation of one mol. of dihydroxy 1,3 diphenyl 1,3 dimethyl cyclobutane. It is therefore possible, and in some cases desirable, to recover half of the phenol immediately, and to react the amines hereinabove enumerated with the secondary product of the reaction of the ketones with phenols. It is accordingly to be understood that the term "a di (hydroxy-aryl) substituted saturated hydrocarbon, derived from a phenol and a ketone" and like terms in the appended claims are employed generically to designate either the primary products of the reaction of such ingredients, or the secondary products such as the cyclobutane derivative described above. The term "dihydroxy diphenyl dialkyl methane" and like expressions are employed in the claims to designate compounds in which both the phenyl groups and the alkyl groups are directly attached to the methane nucleus or other specified nucleus. The term "aryl" is employed to designate any univalent aromatic hydrocarbon radical, as phenyl or tolyl, whose free valence belongs to the nucleus and not to a side chain.

The amine may be any mono or diarylamine such as aniline, toluidine (ortho, meta or para), xylidine, cumidine, cymidine, amino biphenyl, amino bitolyl, naphthylamine (alpha or beta), diphenylamine, phenyl toluidine, phenyl cumidine, phenylamino biphenyl, phenyl naphthylamine, ditolylamine, dixylylamine, dicumylamine, dinaphthylamine, tolyl naphthylamine, naphthylamino biphenyl, etc.

The alkoxy substituted mono and diarylamines such as anisidine, phenetidine, phenyl anisidine, phenyl phenetidine, phenetyl naphthylamine, diphenetylamine, butoxy diphenylamine, etc. are also included within the broad scope of the invention since they are in all respects very similar to the simple alkyl substituted compounds and undergo similar reactions with the formation of products which are excellent anti-oxidants. Preferably the amine employed will be one having a replaceable hydrogen atom in the ortho position of each aryl group, since one of the most valuable of the products is apparently formed only when the ortho position remains free.

The reaction may be carried out in the presence or absence of condensation catalysts such as the ordinary non-oxidizing mineral acids, but the addition of a certain proportion of acid is preferred, because of its effect on the speed of the reaction and its directive effect in influencing the formation of highly active products. The proportions of the reacting ingredients are subject to wide variations, the specific proportions given being set forth merely for purpose of illustration.

The precise mechanism of the reaction is not known, but in those cases in which a secondary amine is not employed as the starting material it apparently involves the condensation of two molecules of primary amine to form a secondary amine. It apparently involves further some sort of temporary combination of the amine with the dihydroxy diaryl alkane and a subsequent splitting off of the phenol, leaving the alkane nucleus substituted in the secondary amino compounds. The products accordingly include aliphatic substituted diarylamines and even heterocyclic secondary amines such as the meso substituted acridanes. This latter class of substances, the meso disubstituted acridanes, are readily and inexpensively prepared in good yields and of high purity by the herein described method.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. The method of preparing an anti-oxidant which comprises heating a di (hydroxy-aryl) substituted saturated hydrocarbon obtained by acid condensation from a phenol and a liquid aliphatic ketone, in the presence of a non-oxidizing mineral acid with a substance having the formula R—NH—R' wherein R is a group selected from the class consisting of aryl groups and alkoxy-aryl groups and R' is a group selected from the class consisting of hydrogen, aryl groups and alkoxy-aryl groups.

2. The method of preparing an anti-oxidant which comprises heating a di (hydroxy-aryl), substituted saturated hydrocarbon, obtained by acid condensation from a phenol and a liquid aliphatic ketone, in the presence of a non-oxidizing mineral acid with an aryl substituted ammonia in which each aryl group contains a replaceable hydrogen in the ortho position and the amino group contains at least one hydrogen.

3. The method of preparing an anti-oxidant which comprises heating a dihydroxy diphenyl dialkyl methane in the presence of a non-oxidizing mineral acid with an aryl substituted ammonia in which each aryl group contains a replaceable hydrogen in the ortho position and the amino group contains at least one hydrogen.

4. The method of preparing an anti-oxidant which comprises heating a dihydroxy diphenyl dialkyl methane with a diarylamine.

5. The method of preparing an anti-oxidant which comprises heating a dihydroxy diphenyl dialkyl methane with a diarylamine in the presence of a non-oxidizing mineral acid.

6. The method of preparing an anti-oxidant which comprises heating a dihydroxy diphenyl dialkyl methane with diphenylamine in the presence of a non-oxidizing acid.

7. The method of preparing an anti-oxidant which comprises heating a di (hydroxy-aryl) substituted saturated hydrocarbon, obtained by acid condensation from a phenol and a liquid aliphatic ketone in the presence of a non-oxidizing mineral acid with a substance having the formula R—NH—R' where R is an aryl or alkoxy-aryl group and R' is hydrogen, and aryl group, or an alkoxy-aryl group, and removing from the product the phenol liberated in the course of the reaction.

8. The method of preparing an anti-oxidant which comprises heating a dihydroxy diphenyl dialkyl methane with a diarylamine, and removing from the product the phenol liberated in the course of the reaction.

9. The method of preparing an anti-oxidant which comprises heating a dihydroxy diphenyl dialkyl methane in the presence of a non-oxidizing mineral acid with an aryl substituted ammonia in which each aryl group contains a replaceable hydrogen in the ortho position and the amino group contains at least one hydrogen, and removing from the product the phenol formed in the course of the reaction.

10. The method of preparing an anti-oxidant which comprises heating a dihydroxy diphenyl dialkyl methane with diphenylamine in the presence of a non-oxidizing mineral acid, and removing from the product the phenol formed in the course of the reaction.

11. The method of preparing an anti-oxidant which comprises adding to a primary arylamine a small proportion of a non-oxidizing mineral acid, heating the mixture to convert at least a portion of the amine to the corresponding diarylamine, and heating the product containing the acid with a dihydroxy diphenyl dialkyl methane.

12. The method of preparing an anti-oxidant which comprises adding to a primary arylamine a small proportion of aqueous hydrochloric acid, heating the mixture in a pressure vessel to convert at least a portion of the amine to the corresponding diarylamine, removing the unreacted arylamine by distillation, and heating the diarylamine containing the acid with a dihydroxy diphenyl dialkyl methane.

13. The method of preparing an anti-oxidant which comprises adding a small proportion of aqueous hydrochloric acid to aniline, heating the mixture in a pressure vessel to convert at least a portion of the amine to diphenylamine, maintaining the pressure during the reaction at a predetermined superatmospheric pressure by bleeding off a portion of the vapors formed, distilling off the unreacted aniline, heating the diphenylamine containing the acid with a dihydroxy diphenyl dialkyl methane, and removing from the product the phenol formed in the course of the reaction.

14. The method of preparing an anti-oxidant which comprises heating a dihydroxy diaryl dialkyl cyclobutane with a substance having the formula R—NH—R' wherein R is an aryl group and R' is a group selected from the class consisting of hydrogen, aryl groups and alkoxy-aryl groups.

15. The method of preparing an anti-oxidant which comprises heating a dihydroxy diphenyl dialkyl cyclobutane with a diarylamine.

16. The method of preparing an anti-oxidant which comprises heating dihydroxy diphenyl dimethyl cyclobutane with diphenylamine and recovering from the product the phenol liberated in the course of the reaction.

17. The method of preparing an anti-oxidant which comprises heating a di(hydroxy-aryl) dialkyl methane in which the aryl groups are members of the benzene series, in the presence of a non-oxidizing mineral acid, with an aryl substituted ammonia in which each aryl group is a member of the benzene series and contains a replaceable hydrogen in the ortho position and the amino group contains at least one hydrogen.

WALDO L. SEMON.